United States Patent [19]

Lister

[11] 4,372,571
[45] Feb. 8, 1983

[54] TRACTOR AND TRAILER COMBINATION

[76] Inventor: Warren S. Lister, 13 Woodmancourt, Godalming, Surrey, GU7 2BT, England

[21] Appl. No.: 172,654

[22] Filed: Jul. 28, 1980

[30] Foreign Application Priority Data

Aug. 8, 1979 [GB] United Kingdom ............... 7927569
Mar. 24, 1980 [GB] United Kingdom ............... 8009887

[51] Int. Cl.³ ..................... B60D 1/14; B62D 53/06
[52] U.S. Cl. ..................... 280/423 A; 280/476 R; 280/479 R; 280/490 R; 280/492
[58] Field of Search ........ 280/476 R, 479 R, 490 R, 280/492, 461 R, 461 A, 423 A

[56] References Cited

U.S. PATENT DOCUMENTS

| | | | |
|---|---|---|---|
| 2,592,219 | 4/1952 | West et al. | 280/476 R |
| 2,669,314 | 2/1954 | Quayle | 280/479 R |
| 3,347,564 | 10/1967 | Snoozy | 280/479 R |
| 3,727,698 | 4/1973 | Van Selus | 280/461 A |
| 3,837,677 | 7/1974 | Haskins | 280/476 R |
| 4,106,791 | 8/1978 | Greatbatch | 280/492 |
| 4,148,499 | 4/1979 | Johnson | 280/490 R |

FOREIGN PATENT DOCUMENTS 2453035 10/1980 France ................... 280/476 R

*Primary Examiner*—Joseph F. Peters, Jr.
*Assistant Examiner*—Donn McGiehan
*Attorney, Agent, or Firm*—Watson, Cole, Grindle & Watson

[57] ABSTRACT

To allow a semi-trailer (9) to be towed by a drawbar tractor (T), a connector device is used to couple the tractor to the trailer. The connector is provided for lifting the trailer, and is arranged so that (i) a single point of articulation is defined between the tractor and trailer, and (ii) no vertical load is transmitted to the tractor from the trailer. The connector includes a sleeve (5) fixedly mounted on the tractor towing plate, an hydraulic ram (4) slidable in the sleeve, a freely rotating castor wheel (3) at the lower end of the ram and a bolt (7) mounted on the ram piston rod (6) for cooperation with the ball socket (10) of the trailer.

6 Claims, 7 Drawing Figures

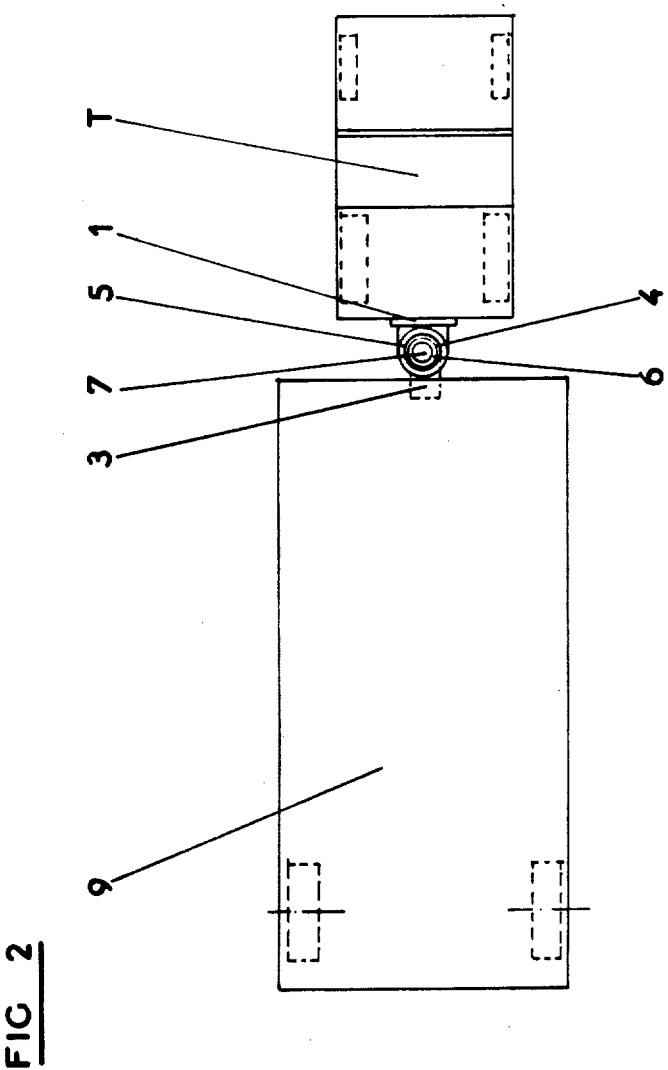

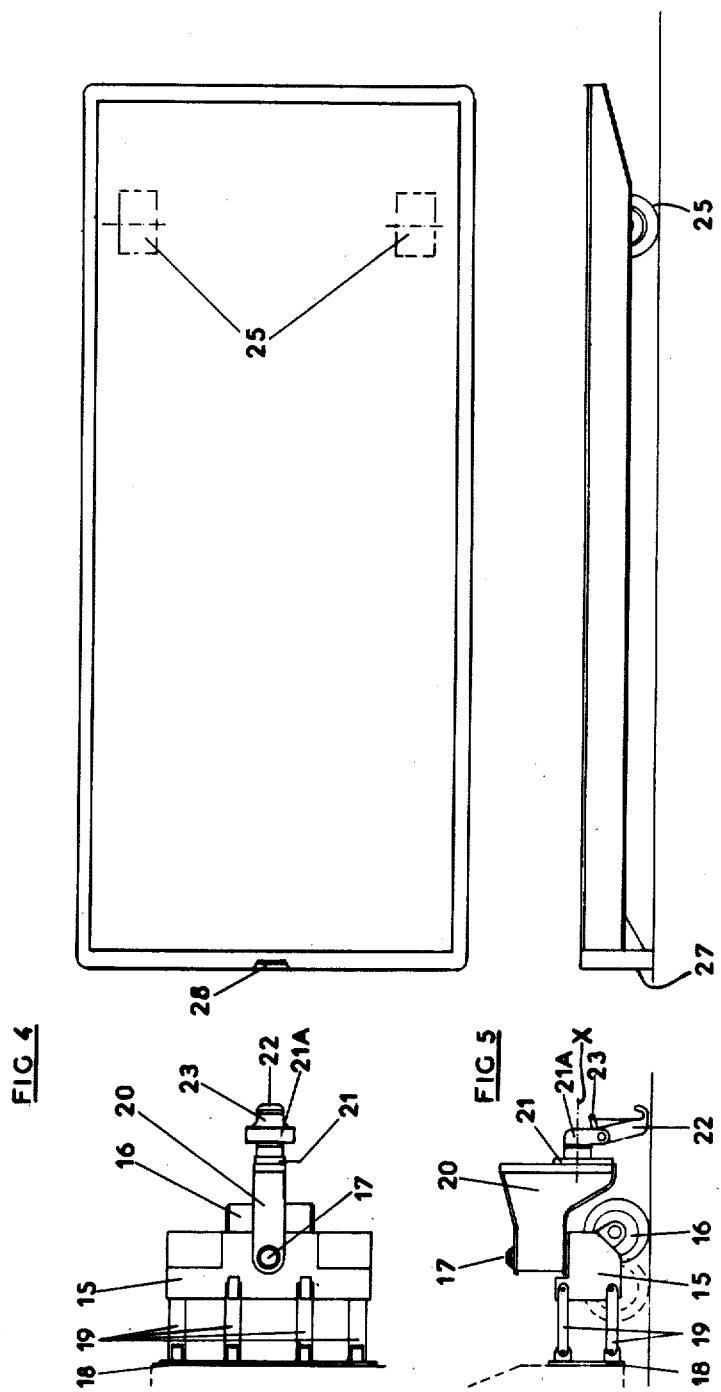

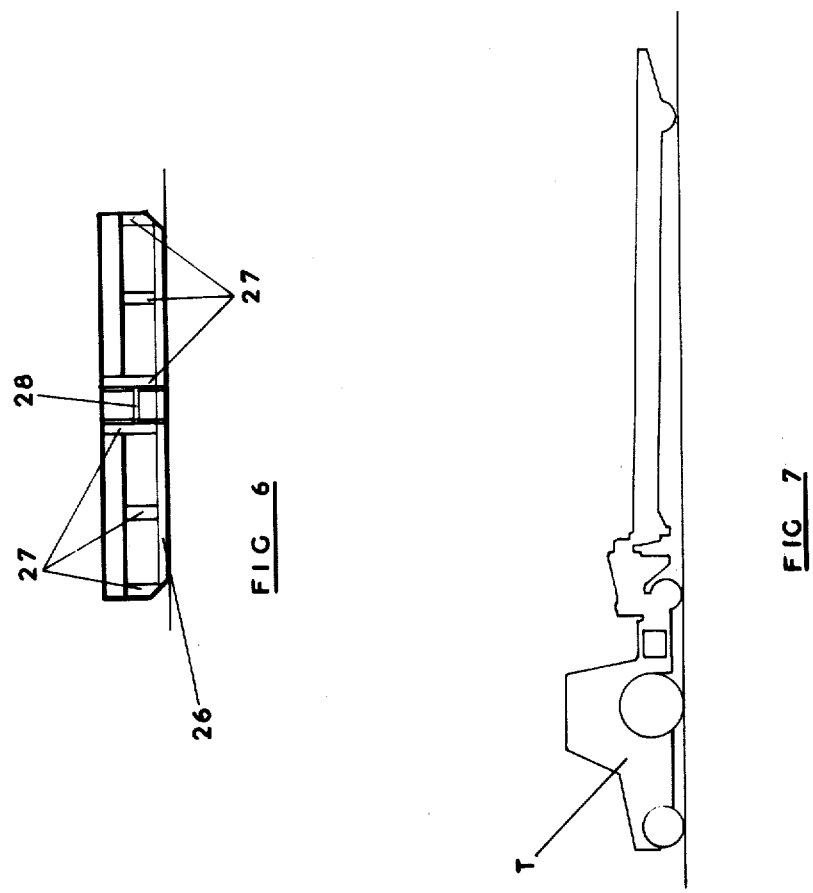

TRACTOR AND TRAILER COMBINATION

This invention relates to tractor and trailer combinations.

Drawbar tractors are known and are used for towing trailers through drawbar connections. These tractors are ballasted to ensure sufficient grip with the ground and apply only pulling forces to the trailers they tow. Consequently, the trailers used with drawbar tractors must have enough ground engaging wheels to be self supporting when being towed. At least one pair of the trailer wheels must be steerable and parking brakes are generally required to prevent trailer motion when disconnected from a tractor. Due to these requirements trailers for drawbar tractors tend to be rather expensive.

Semi-trailers, i.e. trailers having only one pair of fixed wheels normally mounted at the rear end of the trailer, are also known. With trailers of this type the front end of the trailer rests on the ground when it is detached from a tractor, so no parking brakes are required. In addition there are no steerable wheels, so semi-trailers are comparatively inexpensive to manufacture. However, for towing a semi-trailer a tractor is needed which is capable of lifting the front end of the trailer and supporting a substantial part of the trailer load. As a result conventional drawbar tractors cannot be used for towing semi-trailers as they are not designed to accept vertically imposed loads.

There are in existence many load handling systems e.g. at airports and the like, which are based on drawbar tractor drive units. In the majority of cases it would be prohibitively expensive to replace all the drive units, which means that advantage cannot be taken of the cheaper semi-trailers.

There is known a dolly converter which allows a semi-trailer to be towed by a drawbar tractor. The dolly converter comprises a pair of wheels, a tow plate on which the front end of the trailer rests to pivot about the plate axis, and a drawbar which is coupled to the tractor by a second pivotal connection. The major disadvantage of the dolly converter is that there are two essential points of articulation, which has the result that it is very difficult to manoeuvre in reverse and there is a tendency for the dolly converter to jack-knife when travelling down steep slopes, such as ramps, especially when the trailer is heavily laden. These drawbacks make dolly converters of limited practical use.

The present invention aims at eliminating the aforementioned drawbacks and accordingly provides a tractor and trailer combination, comprising a drawbar tractor, a semi-trailer, and a connector interconnecting the tractor and trailer, the connector including means for lifting the trailer, and ground engaging wheel means arranged to support vertical loads imposed on the connector by the trailer, whereby no vertical load is transmitted to the tractor, and said connector defines one single point of articulation between the tractor and trailer.

The connector is preferably coupled to the trailer in a manner permitting some pitching movement between the trailer and connector. A ball and socket connection or other universal joint of similar effect may interconnect the trailer and connector. The lifting means may be operated manually, but is preferably power driven, e.g. electrically or hydraulically.

In one embodiment of the invention the connector includes a load bearing, freely rotating castoring wheel supporting a vertical hydraulic ram surmounted by a universal coupling. The connector includes a frame including means for attaching the frame rigidly to the tractor chassis. The hydraulic ram is extended and retracted for raising and lowering the trailer by means of an hydraulic power take off from the tractor, and is fully controllable by the driver seated in the normal driving position.

According to another embodiment, the connector comprises a frame, a load bearing, freely rotatable castoring wheel supported by the frame and having a vertical axle, an arm pivoted on said axle and carrying a hook for engaging the trailer, means for lifting and lowering the hook, and parallel link arms pivoted to the frame for connecting the connector to the tractor chassis in a manner permitting vertical movement of the connector frame with respect to the tractor.

A more complete understanding of the invention will be had from the following detailed description which is given by way of example with reference to the accompanying drawings, in which:

FIG. 7 is an outline drawing showing the trailer and connector coupled to a drawbar tractor.

Figure 1:
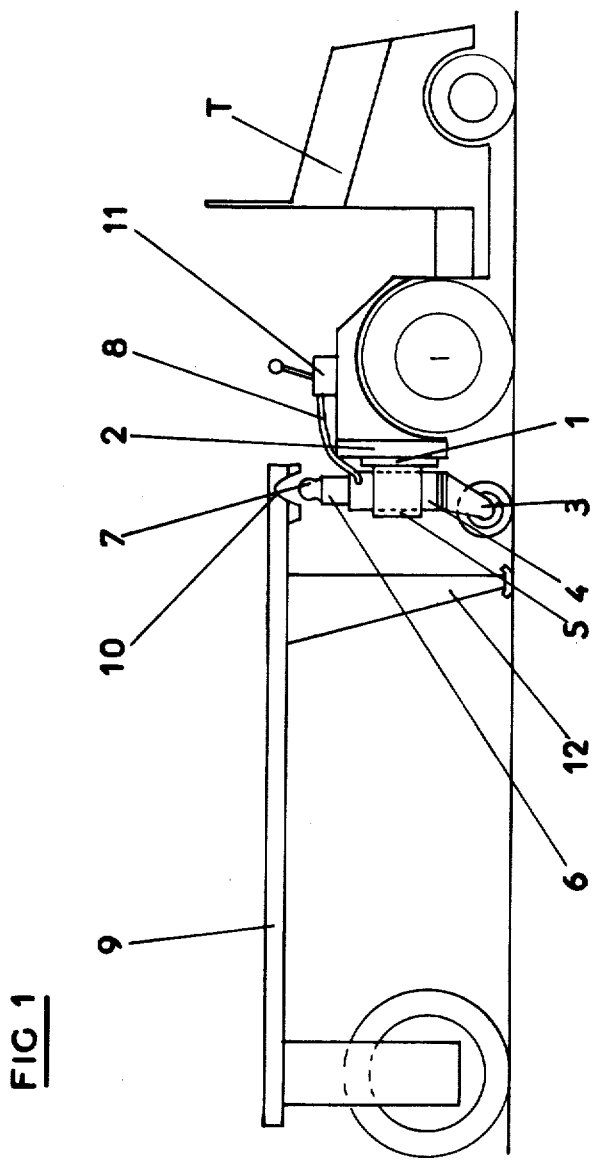
FIG. 1 is a part sectional side elevation of a connector coupling a drawbar tractor and semi-trailer.
Figure 2:
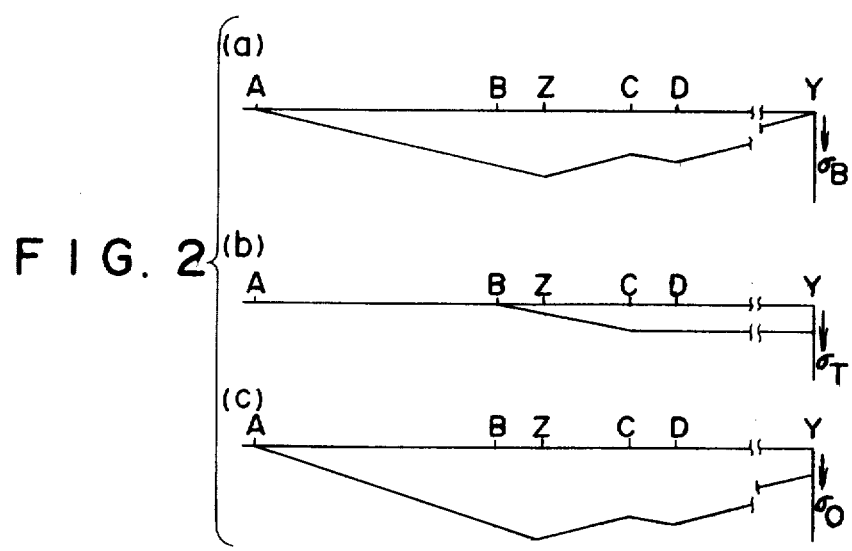
FIG. 2 is a plan view of the combination shown in FIG. 1.
Figure 3:
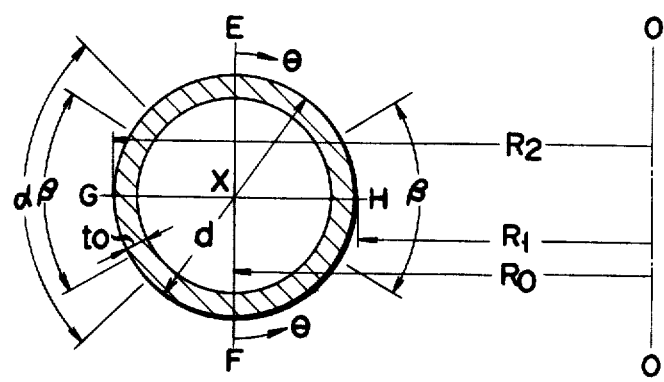
Figure 4:
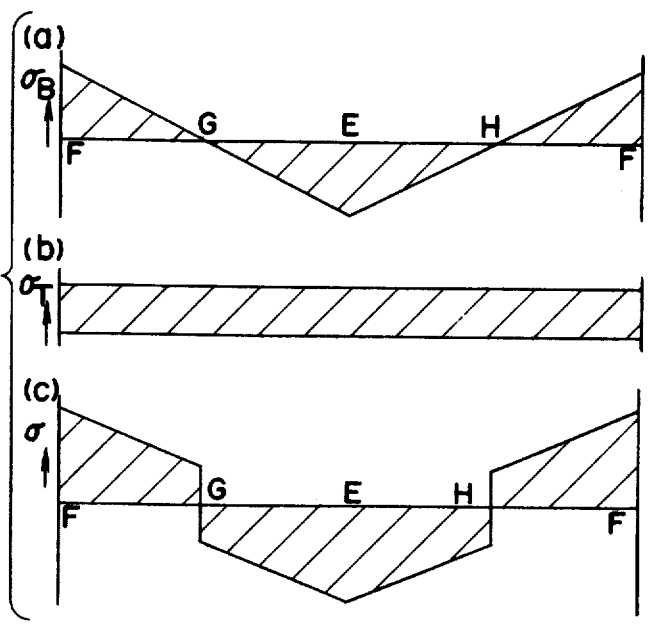
FIG. 4 is a plan view of another connector and low bed trailer.
Figure 5:
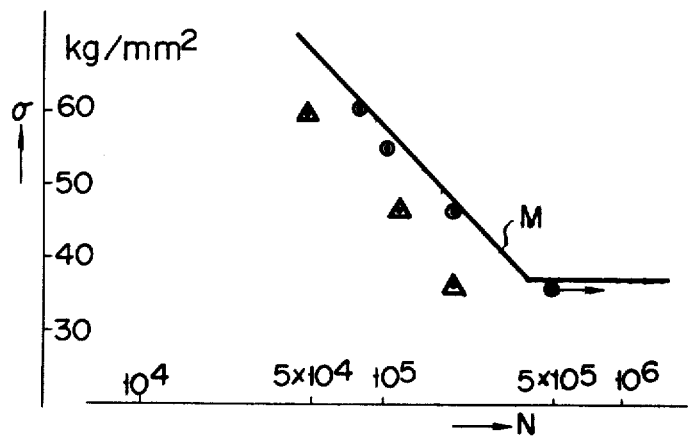
FIG. 5 is a side view of the connector and trailer shown in FIG. 4.
Figure 6:
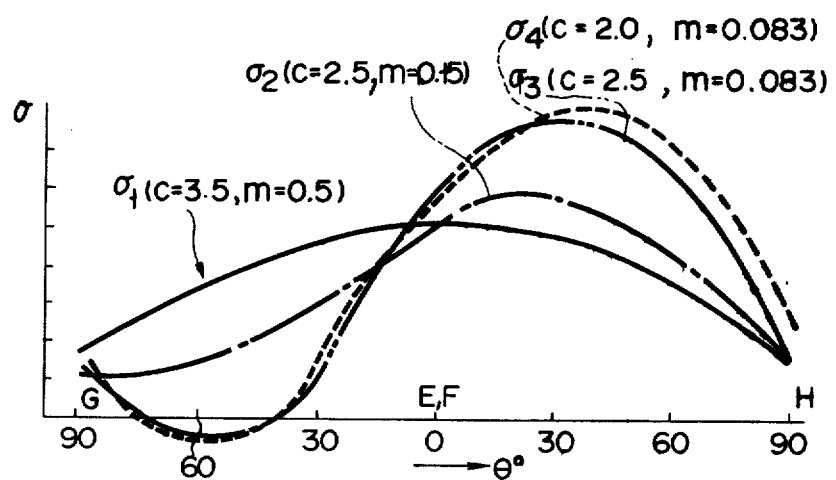
FIG. 6 is a front elevation of the trailer of FIGS. 4 and 5.

Referring to FIGS. 1 and 2 there is shown a ballasted drawbar tractor T, a connector having a frame 1 rigidly fixed to the tractor chassis back plate 2, and a semi-trailer 9 to be coupled to the tractor by the connector. The connector frame includes a sleeve 5 in which the cylinder 4 of an hydraulic ram is slidably mounted. A freely rotatable load bearing castoring wheel 3 is affixed to the lower end of cylinder 4. The piston rod 6 of the hydraulic ram carries a ball 7 for cooperation with a ball socket 10 provided at the front end of the trailer. The hydraulic ram is coupled to the tractor engine power take off through a pipeline 8 and a control device operable by a lever 11 conveniently mounted on the tractor for operation by the driver without leaving his seat.

In use, the connector will normally remain fixed to the tractor although it can be dismounted if required. With the ball 7 fully lowered the tractor is reversed to position the ball 7 beneath the socket 10 of the parked trailer. The driver then operates the control lever 11 to extend the ram and locate the ball 7 into the trailer socket 10. Extension of the ram is continued until the trailer legs 12 are lifted free of the ground. When raised in this way the tractor and trailer combination can be driven easily in either direction. There is only one point of articulation provided by the ball and socket universal joint 7, 10 which also allows some pitching and rolling movement between the tractor and trailer. Furthermore, all the trailer imposed vertical load is supported solely by the castor wheel 3 of the connector so that the tractor is free from vertical loads.

Figure 3:
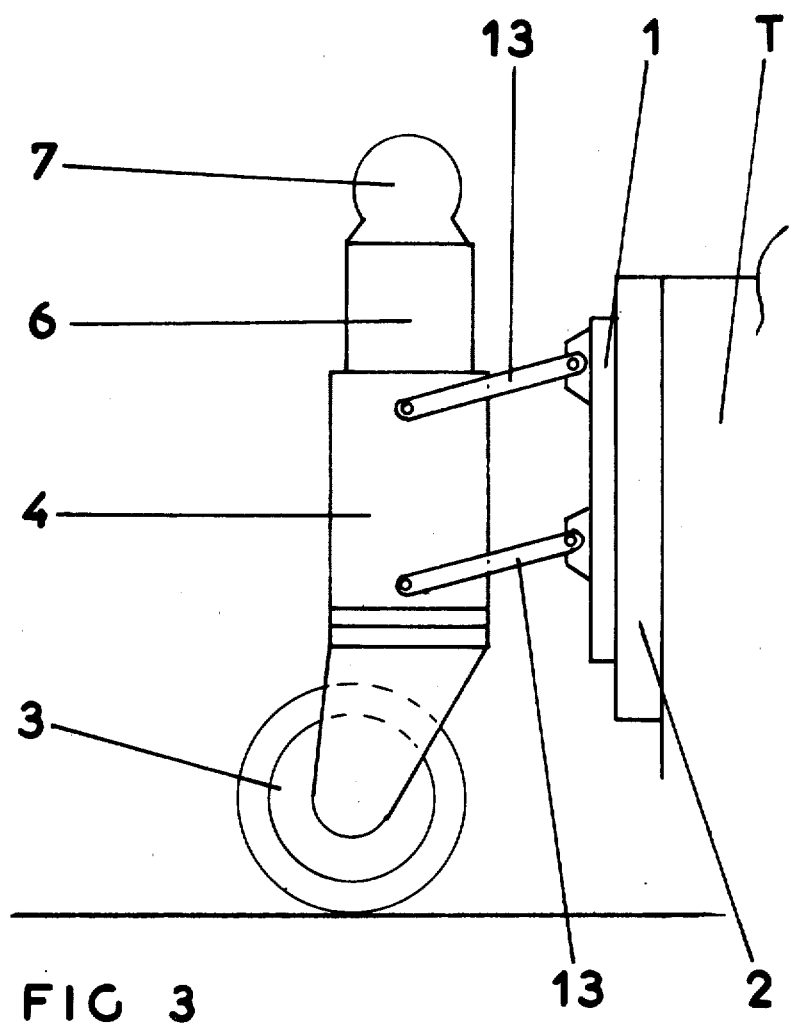
FIG. 3 is a side view showing a modified connector.
Figure 1:
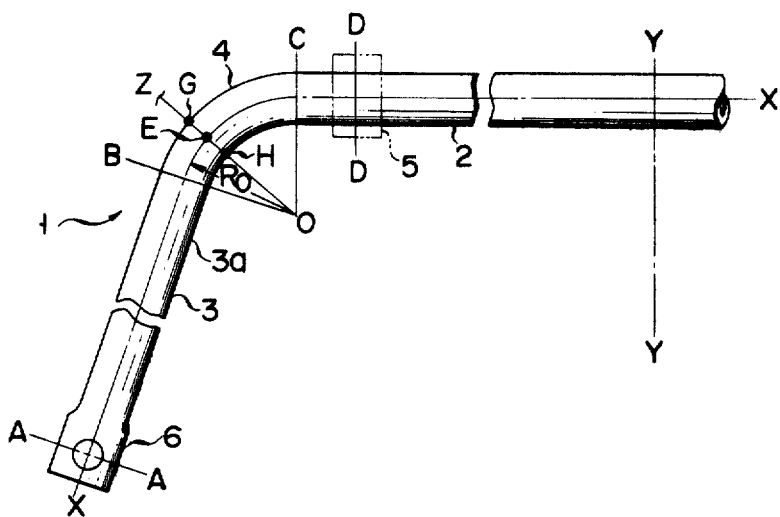

Vertical movement between the connector and tractor is permitted by virtue of the sliding connection between the cylinder 4 and the sleeve 5. In the modified embodiment of FIG. 3, such vertical movement is obtained through an arrangement of parallel arms 13 each pivoted at its opposite ends to the cylinder 4 and a mounting plate 1 attached to the tractor chassis 2.

The alternative connector shown in FIGS. 4 to 7 has a frame 15, a freely rotating castor wheel 16 carried on the lower end of a vertical axle 17 journalled in the frame 15, a mounting plate 18 fixedly mounted on the back plate of a drawbar tractor chassis, and pivoted parallel link arms 19 interconnecting the frame 15 and mounting plate 18 to permit vertical movement between the frame and tractor T. Journalled on the upper end of the axle 17 is an arm 20. At its free end the arm 20 carries a vertically reciprocable slide 21 which is driven by an hydraulic motor, e.g. a ram, mounted within the arm 20. The motor is connected to the tractor engine power take off in similar manner to the ram of FIGS. 1 to 3, in order to be operable by the tractor driver. A hook 22 is pivoted on a part 21a and includes a locking element 23. The part 21a can pivot about a longitudinal horizontal axis X with respect to the slide 21.

The low bed trailer 24 includes a chassis with a pair of wheels 25 at the rear end and a transverse supporting foot 26 carried by pillars 27 at the front end. Extending between two pillars at the centre of the trailer is a horizontal lifting bar 28.

In use, with the connector mounting plate 18 fixedly attached to the tractor chassis back plate and with the slide 21 in its lowermost position, the tractor is reversed to position the hook 22 below the lifting bar 28 of the trailer 24. The hydraulic motor in arm 20 is then operated to raise the slide 21 and engage hook 22 with the bar 28. The hook is caused to turn about its pivot to locate the locking element 23 against the top of trailer 24 in order to prevent the trailer bouncing off the hook whilst being towed. Continued upward displacement of the slide causes the hook to lift the trailer foot 26 free of the ground to the position shown in FIG. 7.

The tractor and trailer combination can now be driven. The only point of articulation between them is at the axis of the vertical axle 17, which means that reversing is easy. In addition, all vertical loads imposed by the trailer 24 are supported by the wheel 16 of the connector so the tractor is only subject to pulling and pushing forces. The hook and bar connection between the trailer and connector allows for some rolling and pitching but no yawing movement between them. The rolling movement is possible due to the pivotal connection between the hook carrying part 21a and the slide 21.

What is claimed is:

1. A tractor and trailer combination comprising a drawbar tractor incapable of supporting substantial vertical loads, a semi-trailer having a forward end devoid of ground engaging wheels, and a connector coupling the forward end of said trailer to said tractor, said connector including a frame, an arm, a pivot connecting said arm to said frame and defining a single point of articulation between said tractor and said trailer, a trailer engaging member, means mounting said member on said arm for vertical reciprocation, and means for raising and lowering said member on said arm, means securing the frame to the tractor for towing the connector, and ground engaging wheel means arranged to support vertical loads imposed on said raising and lowering means by the trailer whereby no vertical load is transmitted to said tractor from the trailer.

2. A tractor and trailer combination as claimed in claim 1 wherein said trailer engaging member is pivotable about a longitudinal horizontal axis to permit movement of the trailer relative to the connector.

3. A tractor and trailer combination as claimed in claim 1, wherein said securing means comprises parallel link arm means, and each said link arm means having opposite ends connected pivotally to said frame and to said tractor respectively.

4. A tractor and trailer combination as claimed in claim 1, wherein said means for raising and lowering said trailer engaging member comprises an hydraulic ram.

5. A tractor and trailer combination as claimed in claim 1, wherein said trailer is provided with a bar at the forward end thereof, and said trailer engaging member comprises a hook for engaging under said bar and a locking element for engaging the trailer to maintain the hook in engagement with the bar and arranged to be moved automatically into engagement with the trailer when the hook lifts the trailer bar.

6. A tractor and trailer combination as claimed in claim 1 or 5, wherein said pivot comprises a vertical axle journalling said arm and carrying said ground engaging wheel means which comprises a castor wheel.

* * * * *